(12) United States Patent
Jin et al.

(10) Patent No.: US 7,164,456 B2
(45) Date of Patent: Jan. 16, 2007

(54) LIQUID CRYSTAL DISPLAY DEVICE AND METHOD OF FABRICATING THE SAME WHEREIN HAVING PARTICULAR REFLECTIVE ELECTRODE

(75) Inventors: Hyun-Suk Jin, Gyeonggi-do (KR); Woo-Nam Jeong, Gyeongsangbuk-do (KR)

(73) Assignee: LG.Philips LCD Co., Ltd, Seoul (KR)

( * ) Notice: Subject to any disclaimer, the term of this patent is extended or adjusted under 35 U.S.C. 154(b) by 243 days.

(21) Appl. No.: 10/809,327

(22) Filed: Mar. 26, 2004

(65) Prior Publication Data

US 2004/0201800 A1 Oct. 14, 2004

(30) Foreign Application Priority Data

Apr. 8, 2003 (KR) .................. 10-2003-0021968

(51) Int. Cl.
*G02F 1/1335* (2006.01)
*G02F 1/1333* (2006.01)

(52) U.S. Cl. ..................... 349/114; 349/138
(58) Field of Classification Search ............... 349/114, 349/138, 113, 110, 106, 44, 139, 96
See application file for complete search history.

(56) References Cited

U.S. PATENT DOCUMENTS

| 6,057,896 | A  | * | 5/2000  | Rho et al. ............... 349/42 |
| 6,570,631 | B1 | * | 5/2003  | Ko ........................ 349/43 |
| 6,693,697 | B1 | * | 2/2004  | Sakamoto et al. ...... 349/138 |
| 6,833,883 | B1 | * | 12/2004 | Park et al. .............. 349/43 |

* cited by examiner

*Primary Examiner*—Andrew Schechter
*Assistant Examiner*—Mike Qi
(74) *Attorney, Agent, or Firm*—Morgan, Lewis & Bockius, LLP

(57) ABSTRACT

A liquid crystal display device includes first and second substrates facing and spaced apart from each other, a gate line and a data line on an inner surface of the first substrate, a thin film transistor connected to the gate line and the data line, a passivation layer on the thin film transistor, a pixel electrode on the passivation layer, an organic insulating film on the pixel electrode corresponding to the data line, a reflective electrode on the organic insulating film and connected to the pixel electrode, a black matrix on an inner surface of the second substrate corresponding to the thin film transistor, a common electrode over the black matrix, and a liquid crystal layer between the reflective electrode and the common electrode.

44 Claims, 8 Drawing Sheets

LIQUID CRYSTAL DISPLAY DEVICE AND METHOD OF FABRICATING THE SAME WHEREIN HAVING PARTICULAR REFLECTIVE ELECTRODE

The present invention claims the benefit of Korean Patent Application No. 2003-21968, filed in Korea on Apr. 8, 2003, which is hereby incorporated by reference.

BACKGROUND OF THE INVENTION

1. Field of the Invention

The present invention relates to a display device and method of fabricating a display device, and more particularly, to a high aperture ratio liquid crystal display device and method of fabricating the same.

2. Discussion of the Related Art

Presently, many types of flat panel display (FPD) devices are actively being developed because of their portability and low power consumption. Among the many types of FPD devices under development, liquid crystal display (LCD) devices are increasingly used as monitors for notebook computers and desktop computers because of their high resolution, ability to display colored images, and superior ability to display moving images.

In general, the LCD devices include two substrates, each having electrodes that face each other, and a liquid crystal layer interposed between the electrodes. When a voltage is supplied to the electrodes, an electric field is generated to modulate light transmittance of the liquid crystal layer by reorienting the liquid crystal molecules, thereby displaying images.

Since the liquid crystal layer does not emit light itself, an additional light source is necessary. Thus, a backlight unit is disposed under an LCD panel to display images by adjusting the amount of light emitted from the backlight unit according to an alignment of the liquid crystal molecules. Accordingly, the electrodes of the two substrates may be formed of transparent conductive material, and the two substrates may be formed of transparent material. Thus, the LCD device is commonly referred to as a transmissive-type LCD device that displays bright images under dark surroundings due to the backlight unit.

FIG. 1 is a schematic cross sectional view of a transmissive-type liquid crystal display device according to the related art. In FIG. 1, first and second substrates 10 and 40 are spaced apart from each other, wherein a gate electrode 12 is formed on an inner surface of the first substrate 10 and a gate insulating layer 14 is formed on the gate electrode 12. An active layer 16 and an ohmic contact layer 18 are subsequently formed on the gate insulating layer 14 over the gate electrode 12. In addition, source and drain electrodes 24 and 26 are formed on the ohmic contact layer 18 to constitute a thin film transistor (TFT) "T" with the gate electrode 12. Similarly, a data line 22, which is connected to the source electrode 24, formed of the same material as the source and drain electrodes 24 and 26 is formed on the gate insulating layer 14.

In FIG. 1, a passivation layer 30 is formed on the data line 22 and source and drain electrodes 24 and 26 to cover the TFT "T." In addition, the passivation layer 30 has a contact hole 32 exposing the drain electrode 26. Accordingly, a pixel electrode 34 is connected to the drain electrode 26 through the contact hole 32 and is formed on the passivation layer 30 in a pixel region (not shown). Since the pixel electrode 34 covers the TFT "T" and overlaps the data line 22, an aperture ratio is improved. The passivation layer 30 is formed of an organic material having a relatively low dielectric constant in order to prevent signal interferences between the pixel electrode 34 and the data line 22.

A black matrix 42 is formed on an inner surface of the second substrate 40, a color filter layer 44, including red, green, and blue sub-color filters 44a, 44b, and 44c, is formed on the black matrix 42 and second substrate 40, and a common electrode 46 of a transparent conductive material is formed on the color filter layer 44. The black matrix 42 covers the TFT "T" and overlaps an edge portion of the pixel electrode 34, wherein one of the sub-color filters 44a, 44b, or 44c corresponds to one pixel electrode 34. In addition, a liquid crystal layer 50 is formed between the pixel electrode 34 and the common electrode 46.

In FIG. 1, a first optical film 62 is formed on an outer surfaces of the first substrate 10, and a second optical film 64 is formed on an outer surface of the second substrate 40. In addition, a first polarizing plate 72 is formed on the first optical film 62, and a second polarizing plate 74 is formed on the second optical film 64. A backlight unit 80 is disposed outside of the first polarizing plate 72, and includes a light guide plate 86 under the first substrate 10, a light source 82 adjacent to a lateral face of the light guide plate 86, and a reflector 84 surrounding the light source 82.

In the transmissive-type LCD device, the black matrix is formed along the edge portion of the pixel electrode, i.e., the portion corresponding to the gate line and the data line to prevent a light leakage. For example, the black matrix has a width of about 10 um to about 20 um, considering the attachment margin of the first and second substrates. Accordingly, an aperture ratio of the LCD device is reduced to be about 60% to about 70%, thereby reducing brightness.

SUMMARY OF THE INVENTION

Accordingly, the present invention is directed to a liquid crystal display device and a method of fabricating a liquid crystal display device that substantially obviates one or more of the problems due to limitations and disadvantages of the related art.

An object of the present invention is to provide a liquid crystal display device having improved aperture ratio and brightness.

Another object of the present invention is to provide a method of fabricating a liquid crystal display device having improved aperture ratio and brightness.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates facing and spaced apart from each other, a gate line and a data line on an inner surface of the first substrate, a thin film transistor connected to the gate line and the data line, a passivation layer on the thin film transistor, a pixel electrode on the passivation layer, an organic insulating film on the pixel electrode corresponding to the data line, a reflective electrode on the organic insulating film and connected to the pixel electrode, a black matrix on an inner surface of the second substrate corresponding to the thin film transistor, a common electrode over the black matrix, and a liquid crystal layer between the reflective electrode and the common electrode.

In another aspect, a liquid crystal display device includes first and second substrates facing and spaced apart from each other, a gate line and a data line on an inner surface of the first substrate, a thin film transistor connected to the gate line and the data line, a passivation layer on the thin film transistor, a pixel electrode on the passivation layer, an organic insulating film on the pixel electrode corresponding to the data line and the thin film transistor, a reflective electrode on the organic insulating film and connected to the pixel electrode, a common electrode over an inner surface of the second substrate, and a liquid crystal layer between the reflective electrode and the common electrode.

In another aspect, a method of fabricating a liquid crystal display device includes forming a gate line and a data line on an inner surface of a first substrate, forming a thin film transistor on the first substrate connected to the gate line and the data line, forming a passivation layer on the thin film transistor, forming a pixel electrode on the passivation layer, forming an organic insulating film on the pixel electrode corresponding to the data line, forming a reflective electrode on the organic insulating film and connected to the pixel electrode, forming a black matrix on an inner surface of a second substrate corresponding to the thin film transistor, forming a common electrode over the black matrix, providing the second substrate opposite to the first substrate, and forming a liquid crystal layer between the reflective electrode and the common electrode.

In another aspect, a method of fabricating a liquid crystal display device includes forming a gate line and a data line on an inner surface of a first substrate, forming a thin film transistor on the first substrate connected to the gate line and the data line, forming a passivation layer on the thin film transistor, forming a pixel electrode on the passivation layer, forming an organic insulating film on the pixel electrode corresponding to the data line and the thin film transistor, forming a reflective electrode on the organic insulating film and connected to the pixel electrode, forming a common electrode over an inner surface of a second substrate, providing the second substrate opposite to the first substrate, and forming a liquid crystal layer between the reflective electrode and the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, an example of which is illustrated in the accompanying drawings.

Figure 1:
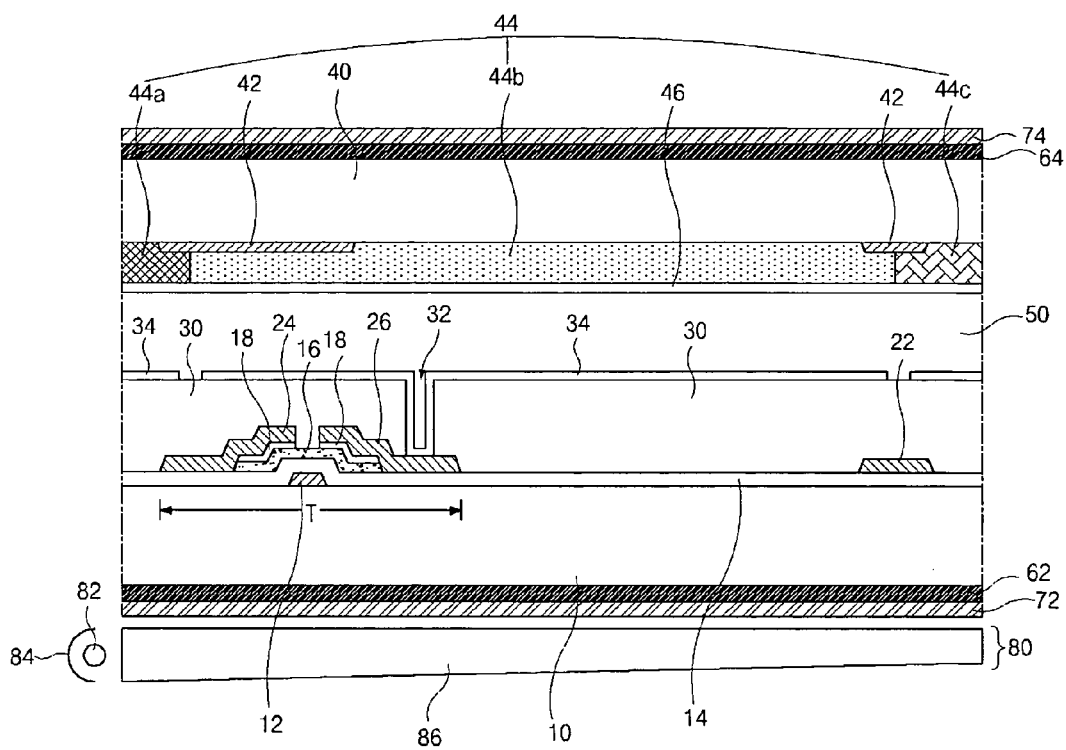
FIG. 1 is a schematic cross sectional view of a transmissive-type liquid crystal display device according to the related art.
Figure 2:
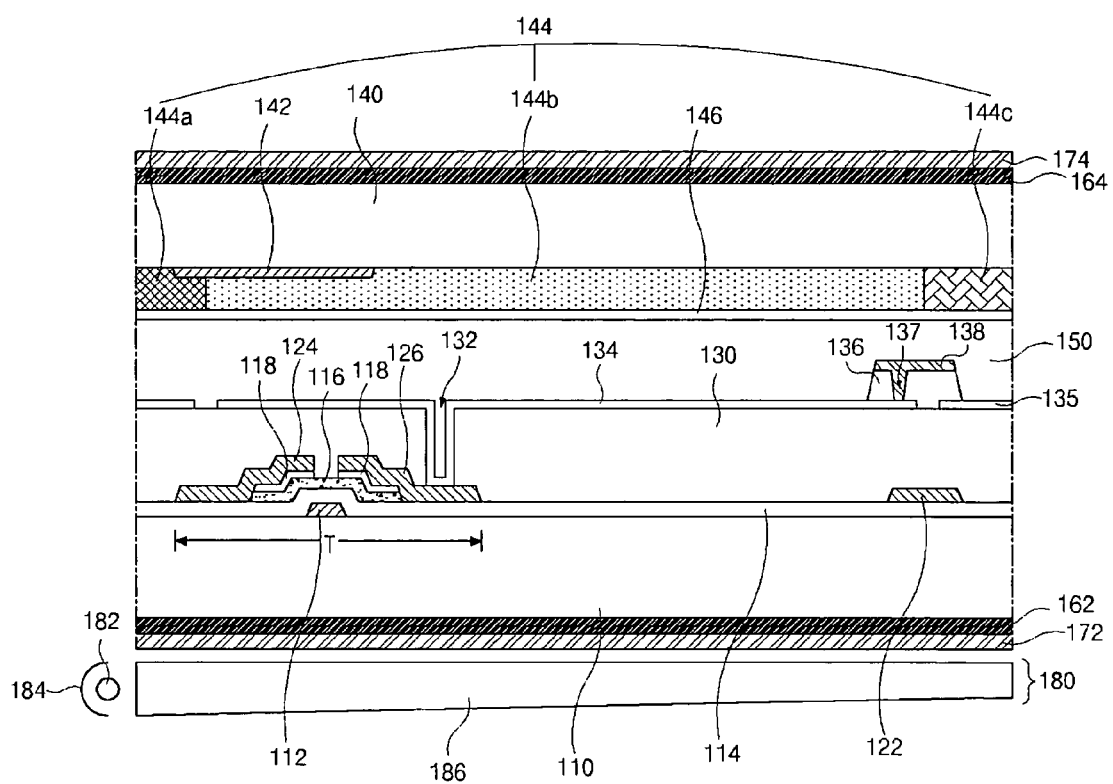
FIG. 2 is a schematic cross sectional view of an exemplary liquid crystal display device according to the present invention.

FIG. 2 is a schematic cross sectional view of an exemplary liquid crystal display device according to the present invention. In FIG. 2, first and second substrates 110 and 140 may be disposed to face and be spaced apart from each other, wherein the first and second substrates 110 and 140 may be formed of transparent material. In addition, a gate electrode 112 of metallic material may be formed on an inner surface of the first substrate 110, and a gate insulating layer 114 of silicon nitride or silicon oxide may be formed on the gate electrode 112. Although not shown, a gate line connected to the gate electrode 112 may be formed under the gate insulating layer 114.

In FIG. 2, an active layer 116 of amorphous silicon may be formed on the gate insulating layer 114, and an ohmic contact layer 118 of impurity-doped amorphous silicon may be formed on the active layer 116. Accordingly, source and drain electrodes 124 and 126 of conductive material, such as a metal, may be formed on the ohmic contact layer 118, wherein the source and drain electrodes 124 and 126 may be spaced apart from each other. Next, a data line 122 of the same material as the source and drain electrodes 124 and 126 may be formed on the gate insulating layer 114, and may be connected to the source electrode 124 and may cross the gate line (not shown) to define a pixel region (not shown). Thus, the source and drain electrodes 124 and 126 may constitute a thin film transistor (TFT) "T" along with the gate electrode 112.

Then, a passivation layer 130 may be formed on the data line 122 and the source and drain electrodes 124 and 126, wherein the passivation layer 130 may be formed of organic material having a relatively low dielectric constant. In addition, the passivation layer 130 may have a first contact hole 132 that exposes a portion of the drain electrode 126. Next, a pixel electrode 134 of transparent conductive material may be formed on the passivation layer 130 and may be connected to the drain electrode 126 through the first contact hole 132. The pixel electrode 134 may be formed of indium-tin-oxide (ITO) or indium-zinc-oxide (IZO), and may cover the TFT "T" and overlap the data line 122.

Next, an organic insulating film 136 may be formed on the pixel electrode 134 over the data line 122. The organic insulating film 136 may overlap an edge portion of the pixel electrode 134 and may have a second contact hole 137 to expose a portion of the pixel electrode 134. The organic insulating film 136 may be formed of the same material as the passivation layer 130, i.e., an organic material having a relatively low dielectric constant.

Then, a reflective electrode 138 may be formed on the organic insulating film 136 and may be connected to the pixel electrode 134 through the second contact hole 137. In addition, the reflective electrode 138 may not be connected to an adjacent pixel electrode 135. Since a width of the reflective electrode 138 may be greater than a width of the data line 122 and the reflective electrode 138 may cover the data line 122, the reflective electrode 138 may function as a black matrix to prevent light leakage at the edge portion of the pixel electrode 134.

In FIG. 2, a black matrix 142 may be formed on an inner surface of the second substrate 140. Since the black matrix 142 may cover the TFT "T," generation of a photocurrent in the TFT "T" may be prevented. Moreover, since the reflective electrode 138 may function as a black matrix, the black matrix 142 may be formed to correspond to the TFT "T" and may not necessarily be formed at the edge portion of the pixel electrode 134.

Next, a color filter layer 144 including red, green, and blue sub-color filters 144a, 144b, and 144c may be formed on the black matrix 142, wherein one of the sub-color filters 144a, 144b, or 144c may correspond to one pixel region. Then, a common electrode 146 of transparent conductive material may be formed on the color filter layer 144, wherein the common electrode 146 may be formed of the same material as the pixel electrode 134, i.e., indium-tin-oxide (ITO) or indium-zinc-oxide (IZO). In addition, an overcoat layer (not shown) may be formed between the color filter layer 144 and the common electrode 146.

In FIG. 2, a liquid crystal layer 150 may be formed between the pixel electrode 134 and the common electrode 146 and between the reflective electrode 138 and the common electrode 146. When a voltage is supplied to the pixel electrode 134 and the common electrode 146, an electric field may be generated between the pixel electrode 134 and the common electrode 146. Accordingly, liquid crystal molecules of the liquid crystal layer 150 may be re-arranged according to the supplied electric field. Since the voltage may be supplied to the reflective electrode 138, the liquid crystal molecules corresponding to the reflective electrode may also be re-arranged. Although not shown, orientation films may be formed between the pixel electrode 134 and the liquid crystal layer 150, between the reflective electrode 138 and the liquid crystal layer 150, and between the common electrode 146 and the liquid crystal layer 150 to determine initial alignment states of the liquid crystal molecules.

In addition, a first optical film 162 may be formed on an outer surface of the first substrate 110, and a second optical film 164 may be formed on an outer surface of the second substrate 140. In addition, a first polarizing plate 172 may be formed on the first optical film 162, and a second polarizing plate 174 may be formed on the second optical film 164. The first and second optical films 162 and 164 may be formed of a quarter wave plate (QWP) having a retardation of about λ/4, and an optical axis of the first polarizing plate 172 may be perpendicular to an optical axis of the second polarizing plate 174. In addition, a backlight unit 180 may be disposed outside of the first polarizing plate 172, and may include a light guide plate 186 under the first substrate 110, a light source 182 adjacent to a lateral face of the light guide plate 186, and a reflector 184 surrounding the light source 182. The light guide plate 186 may convert linear light of the light source 182 into planar light, and light of the light source 182 may be reflected from the reflector 184 and enter the light guide plate 186.

According to the present invention, a reflective electrode may be formed at a light-shielding region where a gate line and a data line are formed. Since the reflective electrode reflects ambient light, the light-shielding region may be referred to as a micro-reflective portion.

Figure 3:
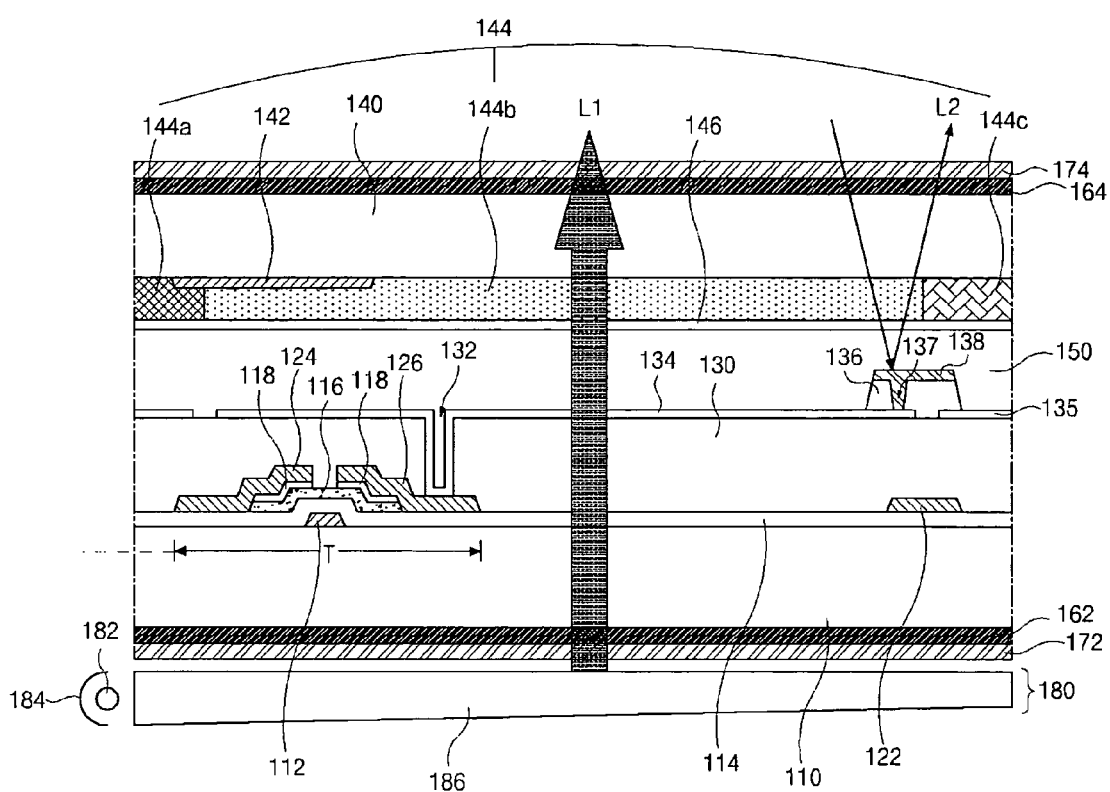
FIG. 3 is a schematic cross sectional view of a light path in the liquid crystal display device of FIG. 2 according to the present invention.

FIG. 3 is a schematic cross sectional view of a light path in the liquid crystal display device of FIG. 2 according to the present invention. In FIG. 3, a first light "L1" from the backlight unit 180 may subsequently pass through the first polarizing plate 172, the first optical film 162, the pixel electrode 134, the liquid crystal layer 150, the common electrode 146, the color filter layer 114, the second optical film 164, and the second polarizing plate 174, and may be emitted from the LCD device. Accordingly, the light emitted from the backlight unit 180 to a region corresponding to the data line 122 and the reflective electrode 138 may be shielded by the data line 122 and the reflective electrode 138, and may not pass through the LCD device.

In FIG. 3, a second light "L2" from an exterior may subsequently pass through the second polarizing plate 174, the second optical film 162, the color filter layer 144, and the liquid crystal layer 150, and may be reflected from the reflective electrode 138. Accordingly, the second light "L2" reflecting from the reflective electrode 138 may subsequently pass through the liquid crystal layer 150, the common electrode 146, the color filter layer 144, the second optical film 164, and the second polarizing plate 174, and may be emitted from the LCD device.

To optimize optical properties of the first and second lights "L1" and "L2," a thickness of the liquid crystal layer 150 corresponding to the pixel electrode 134 may be about double a thickness of the liquid crystal layer 150 corresponding to the reflective electrode 138. Moreover, the thickness of the liquid crystal layer 150 may be adjusted by the thickness of an organic insulating film 136.

According to the present invention, since the reflective electrode connected to the pixel electrode may be formed over the data line, exterior light may be reflected from the reflective electrode. Thus, the LCD device according to the present invention may use a non-display region corresponding to a data line to be formed as a reflective portion by forming a reflective electrode. Since a transmissive portion may remain constant and a reflective portion may be added, aperture ratio and brightness may be improved. Moreover, since the LCD device according to the present invention uses a micro-reflective portion, brightness may further be improved under bright ambient lighting conditions. The reflective electrode may be formed to correspond to a gate line. In addition, the LCD device may further include a storage capacitor, and the reflective electrode may be formed to correspond to the storage capacitor.

Figure 4:
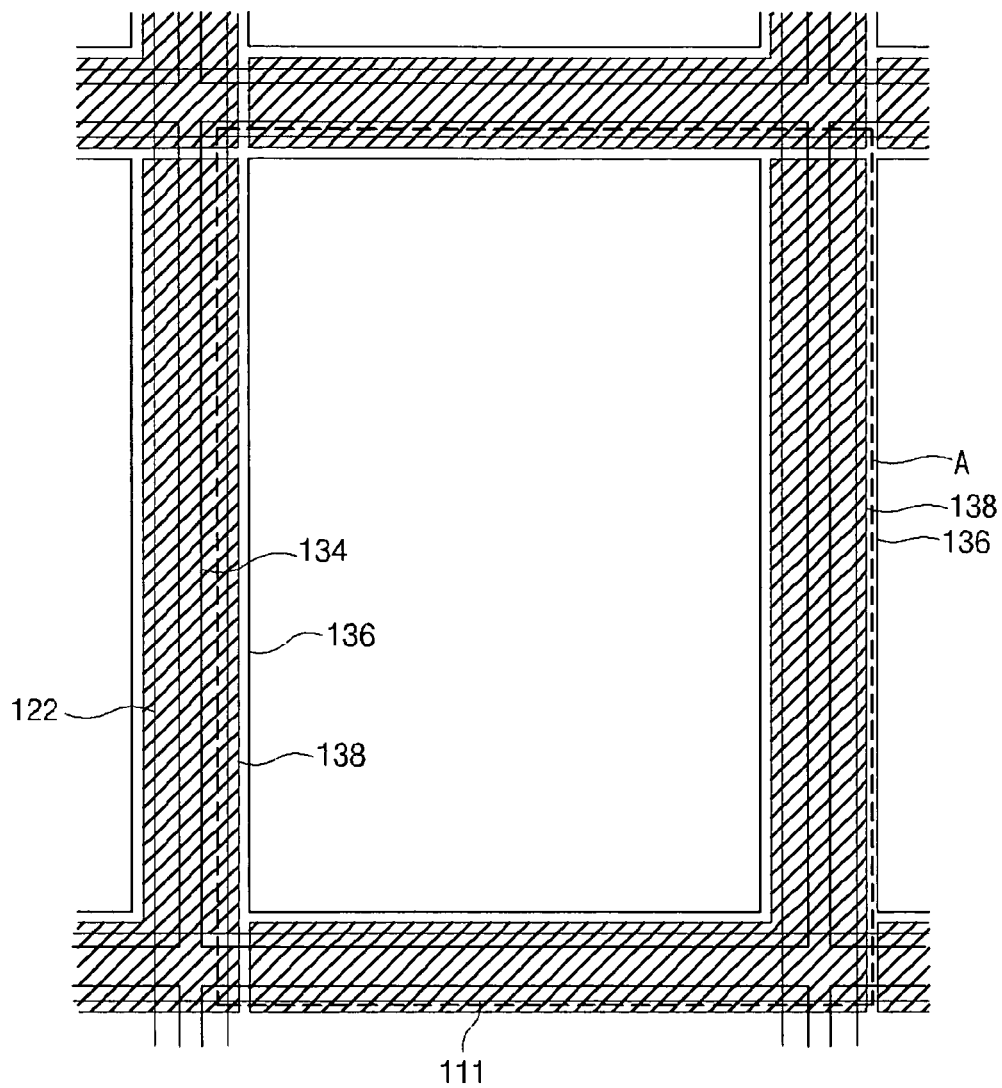
FIG. 4 is a schematic plan view of the exemplary liquid crystal display device of FIG. 2 according to the present invention.

FIG. 4 is a schematic plan view of the exemplary liquid crystal display device of FIG. 2 according to the present invention. In FIG. 4, a gate line 111 may cross the data line 122 to define a pixel region (not shown), and the pixel electrode 134 may be formed in the pixel region to overlap the gate line 111 and the data line 122. In addition, the organic insulating film 136 may be formed to cover the gate line 111 and the data line 122, and may overlap an edge portion of the pixel electrode 134. A reflective electrode 138 may be formed to cover the gate line 111, the data line 122, and the edge portion of the pixel electrode 134, wherein the reflective electrode 138 of each pixel region may be electrically separated from that of an adjacent pixel region and may be connected to the pixel electrode 134. Accordingly, a display region "A" corresponding to the pixel electrode 136 and the reflective electrode 138 may be larger than the pixel region (not shown) defined by the gate line 111 and the data line 122. Thus, an aperture ratio of the LCD device where the reflective electrode is formed over the gate line and the data line may be about 91%.

Figure 5:
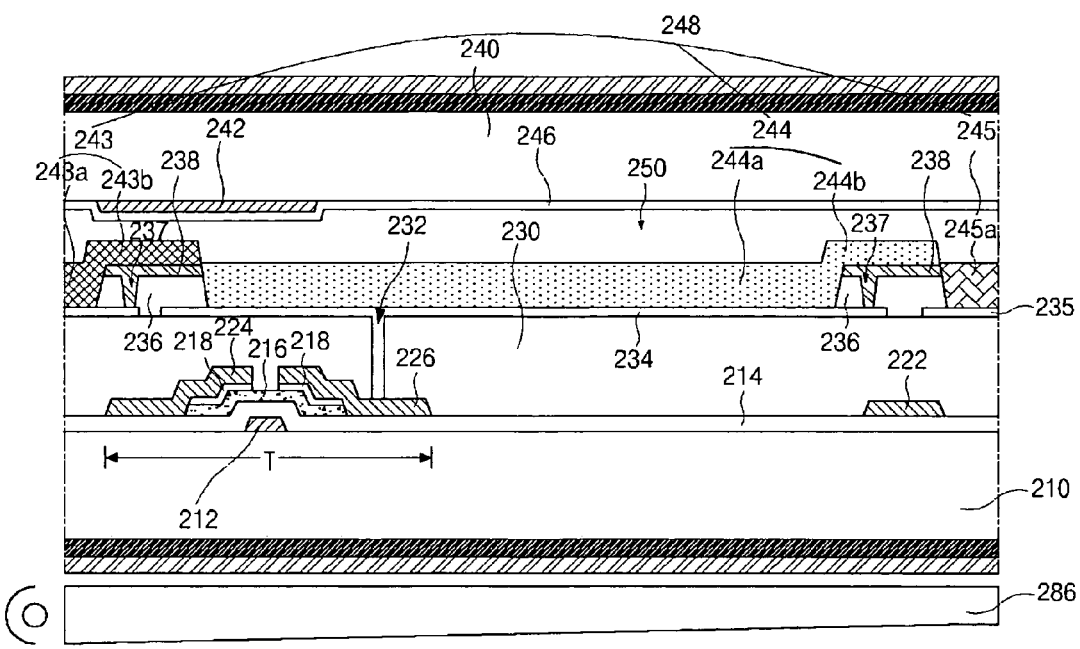
FIG. 5 is a schematic cross sectional view of another exemplary liquid crystal display device according to the present invention.

FIG. 5 is a schematic cross sectional view of another exemplary liquid crystal display device according to the present invention. In FIG. 5, a liquid crystal display may have a color filter-on-thin film transistor (COT) structure. Since optical films, polarizing plates, and a backlight unit of the LCD device according to the present invention may be similar to those according to the LCD of FIGS. 3 and 4, illustration for the optical films, the polarizing plates, and the backlight unit will be omitted.

In FIG. 5, first and second substrates 210 and 240 may be disposed to face and be spaced apart from each other, wherein the first and second substrates 210 and 240 may be formed of transparent material. In addition, a gate electrode 212 may be formed on an inner surface of the first substrate 210, and a gate insulating layer 214 may be formed on the gate electrode 212. Although not shown, a gate line connected to the gate electrode 212 may be formed under the gate insulating layer 214.

In FIG. 5, an active layer 216 of amorphous silicon may be formed on the gate insulating layer 214, and an ohmic contact layer 218 of impurity-doped amorphous silicon may be formed on the active layer 216. In addition, source and drain electrodes 224 and 226 spaced apart from each other may be formed on the ohmic contact layer 218, and a data line 222 of the same material as the source and drain electrodes 224 and 226 may be formed on the gate insulating layer 214. Accordingly, the data line 222 may be connected to the source electrode 224 and may cross the gate line (not shown) to define a pixel region (not shown). Thus, the source and drain electrodes 224 and 226 may constitute a thin film transistor (TFT) "T" along with the gate electrode 212.

Then, a passivation layer 230 may be formed on the data line 222 and the source and drain electrodes 224 and 226, and may be formed of organic material having a relatively low dielectric constant. In addition, the passivation layer 230 may have a first contact hole 232 that exposes a portion of the drain electrode 226, and a pixel electrode 234 of transparent conductive material may be formed on the passivation layer 230 and may be connected to the drain electrode 226 through the first contact hole 232. The pixel electrode 234 may be formed of indium-tin-oxide (ITO) or indium-zinc-oxide (IZO), and may cover the TFT "T" and overlap the data line 222.

Next, an organic insulating film 236 may be formed on the pixel electrode 234 over the data line 222, and may overlap an edge portion of the pixel electrode 234 and may have a second contact hole 237 that exposes a portion of the pixel electrode 234. The organic insulating film 236 may be formed of the same material as the passivation layer 230, i.e., an organic material having a relatively low dielectric constant.

Then, a reflective electrode 238 may be formed on the organic insulating film 236 and may be connected to the pixel electrode 234 through the second contact hole 237. In addition, the reflective electrode 238 may not be connected to an adjacent pixel electrode 235. Since a width of the reflective electrode 238 may be greater than a width of the data line 222 and the reflective electrode 238 may cover the data line 222, the reflective electrode 238 may function as a black matrix to prevent light leakage at the edge portion of the pixel electrode 234.

Next, a color filter layer 248 including red, green, and blue sub-color filters 243, 244, and 245 may be formed on the pixel electrode 234 and the reflective electrode 238. Accordingly, one of the sub-color filters 243, 244, or 245 may correspond to the pixel electrode 234 and the reflective electrode 238 connected to the pixel electrode 234 in one pixel region. Each of sub-color filters 243, 244, and 245 may have a first portion 243a, 244a, and 245a that may correspond to the pixel electrode 243, and may have a second portion 243b and 244b that may correspond to the reflective electrode 238. To obtain uniform color properties, the first portions 243a, 244a, and 245a of each of the sub-color filters 243, 244, and 245 may be formed to have a thickness greater than a thickness of the second portions 243b and 244b. While ambient light may pass through the second portions 243b and 244b twice, light from a backlight unit 286 may pass through the first portions 243a, 244a, and 245a only once. If the first portions 243a, 244a, and 245a have the same thickness as the second portions 243b and 244b, the first portions 243a, 244a, and 245a may have different color properties from the second portions 243b and 244b. Accordingly, uniform color properties may be obtained by forming each of the sub-color filters 243, 244, and 245 to have the first and second portions of different thickness.

The color filter layer 248 may be formed by coating and patterning color filter resin on the pixel electrode 234 and the reflective electrode 238. Since the reflective electrode 238 may be formed on the organic insulating film 236 between adjacent pixel electrodes 234 and may overlap the gate line (not shown) and the data line 222, a step difference may be generated along a border between the pixel electrode 234 and the reflective electrode 238. While the color filter resin may be coated on the pixel electrode 234 and the reflective electrode 238, the color filter resin may flow from the reflective electrode 238 to the pixel electrode 234 due to the step difference. Accordingly, first portions 243a, 244a, and 245a of each of the sub-color filters 243, 244, and 245 on the pixel electrode 234 may be formed to be thicker than the second portions 243b and 244b of each of the sub-color filters 243, 244, and 245 on the reflective electrode 238. The thickness difference of each of the sub-color filters 243, 244, and 245 may be adjusted by a viscosity of the color filter resin and a height of the step difference. For example, the thickness of the second portions 243b and 244b may be about one-half of the thickness of the first portions 243a, 244a, and 245a.

Next, a black matrix 242 may be formed on an inner surface of the second substrate 240. Since the black matrix 242 may cover the TFT "T," generation of a photocurrent in the TFT "T" may be prevented. Moreover, since the reflective electrode 238 may function as a black matrix, the black matrix 242 may be formed to correspond to the TFT "T" and may not be formed at the edge portion of the pixel electrode 234. Then, a common electrode 246 of transparent conductive material may be formed on the black matrix 242, and may be formed of the same material as the pixel electrode 234, i.e., indium-tin-oxide (ITO) or indium-zinc-oxide (IZO).

According to the present invention, aperture ratio and brightness may be improved by forming a micro-reflective portion over the gate line and the data line. In addition, since a color filter layer and a TFT may be formed on a substrate, an attachment margin necessary for an LCD device where a TFT and a color filter layer are formed on respective substrates may be reduced and reduction of color property and brightness may be prevented. In addition, since a thickness of a color filter layer in a transmissive portion may be different from a thickness of a color filter layer in a micro-reflective portion, color properties may be further improved.

Figure 6:
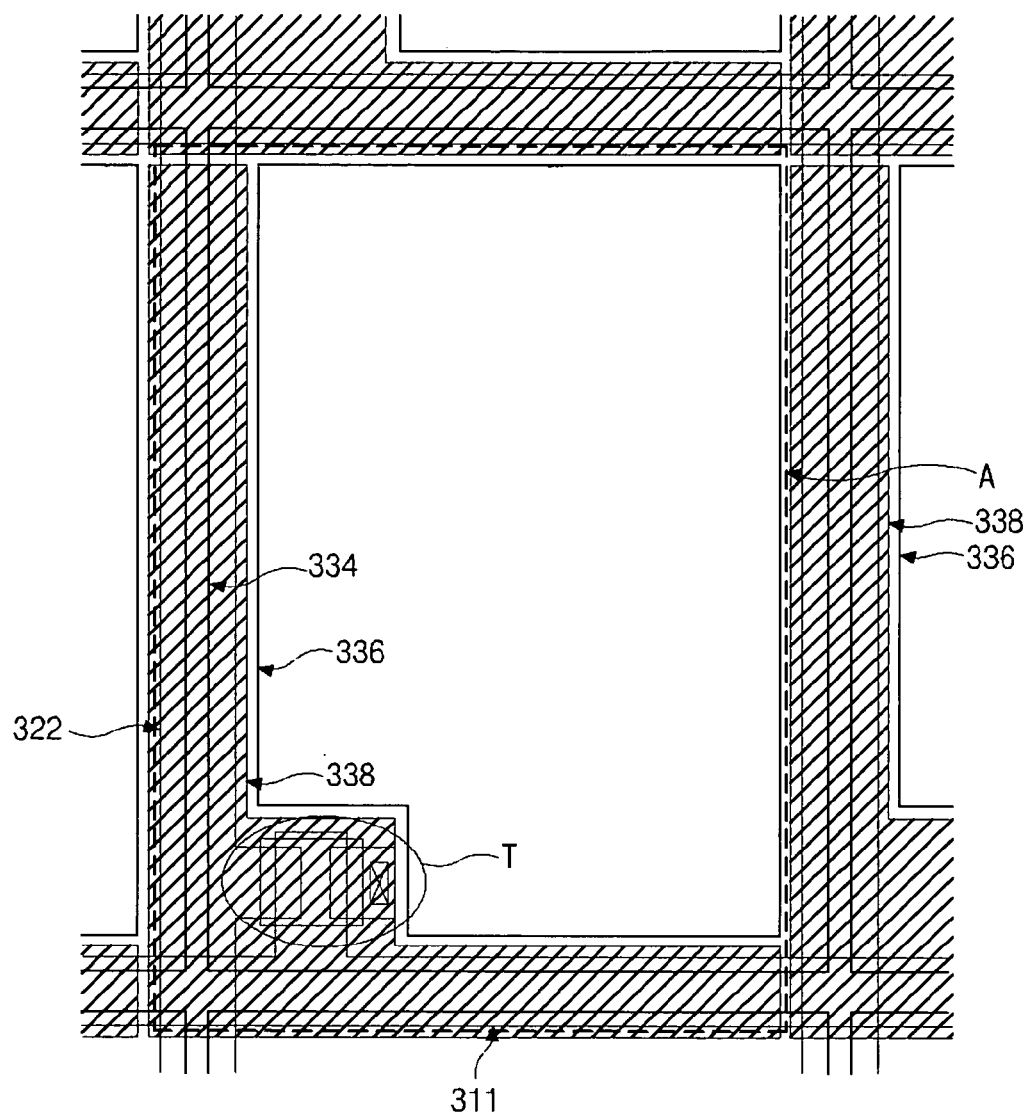
FIG. 6 is a schematic plan view of other exemplary liquid crystal display devices according to the present invention.

FIG. 6 is a schematic plan view of other exemplary liquid crystal display devices according to the present invention. In FIG. 6, a gate line 311 may cross a data line 322 to define a pixel region (not shown), and a pixel electrode 334 may be formed in the pixel region. Accordingly, the pixel electrode 334 may overlap the gate line 311 and the data line 322. In addition, an organic insulating film 336 may be formed to cover the gate line 311, the data line 322, and a thin film transistor (TFT) "T" connected to the gate line 311 and the data line 322. Accordingly, the organic insulating film 336 may overlap an edge portion of the pixel electrode 334.

Next, a reflective electrode 338 may be formed on the organic insulating film 336 to cover the gate line 311, the data line 122, the TFT "T," and the edge portion of the pixel electrode 334. In addition, the reflective electrode 338 of each pixel region may be electrically separated from that of an adjacent pixel region. For example, the reflective electrode 338 may be formed over the TFT "T," the gate line 311 at a lower portion of the pixel region, and the data line 322 at a left portion of the pixel region as a single body, wherein the reflective electrode 338 may be connected to the pixel electrode 334. Accordingly, a display region "A" corresponding to the pixel electrode 336 and the reflective electrode 338 may be larger than the pixel region (not shown) defined by the gate line 311 and the data line 322. Since the display region "A" may correspond to the gate line 311, the data line 322, and the TFT "T," an aperture ratio of the LCD device according to the present invention may be substantially about 100%.

Figure 7:
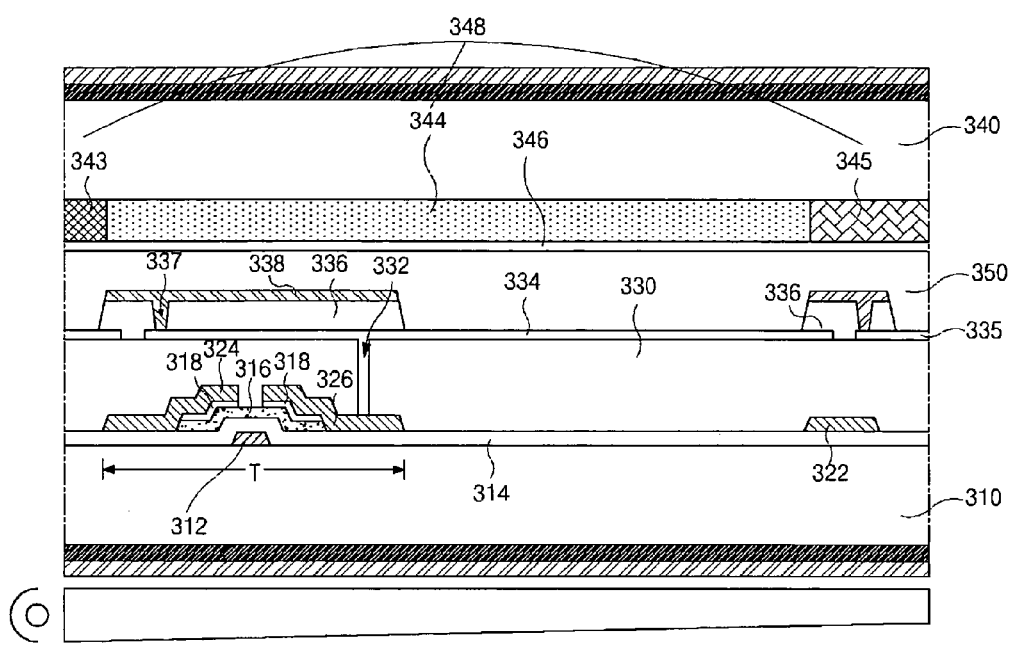
FIG. 7 is a schematic cross sectional view of the exemplary liquid crystal display device of FIG. 6 according to the present invention.

FIG. 7 is a schematic cross sectional view of the exemplary liquid crystal display device of FIG. 6 according to the present invention. In FIG. 7, first and second substrates 310 and 340 may be disposed to face and be spaced apart from each other, wherein the first and second substrates 310 and 340 may be formed of transparent material. In addition, a gate electrode 312 may be formed on an inner surface of the first substrate 310 and a gate insulating layer 314 is formed on the gate electrode 312. Although not shown, a gate line connected to the gate electrode 312 may be formed under the gate insulating layer 314.

Next, an active layer 316 may be formed on the gate insulating layer 314 and an ohmic contact layer 318 may be formed on the active layer 316. Then, source and drain electrodes 324 and 326 may be formed on the ohmic contact layer 318, and may be spaced apart from each other. Next, a data line 322 connected to the source electrode 324 may be formed on the gate insulating layer 314, wherein the data line 322 may cross the gate line (not shown) to define a pixel region (not shown). Thus, the source and drain electrodes 324 and 326 may constitute a thin film transistor (TFT) "T" along with the gate electrode 312.

Then, a passivation layer 330 may be formed on the data line 322 and the source and drain electrodes 324 and 326, wherein the passivation layer 330 may be formed of organic material having a relatively low dielectric constant. In addition, the passivation layer 330 may have a first contact hole 332 that exposes a portion of the drain electrode 326. Next, a pixel electrode 334 of transparent conductive material may be formed on the passivation layer 330, and may be connected to the drain electrode 326 through the first contact hole 332. The pixel electrode 334 may be formed of indium-tin-oxide (ITO) or indium-zinc-oxide (IZO), and may cover the TFT "T" and may overlap the data line 322.

Next, an organic insulating film 336 may be formed on the pixel electrode 334 over the data line 322 and the TFT "T." In addition, the organic insulating film 336 may overlap an edge portion of the pixel electrode 334 and may have a second contact hole 337 that exposes a portion of the pixel electrode 334. The organic insulating film 136 may be formed of the same material as the passivation layer 330, i.e., an organic material having a relatively low dielectric constant.

Next, a reflective electrode 338 may be formed on the organic insulating film 336 and may be connected to the pixel electrode 334 through the second contact hole 337. The reflective electrode 338 corresponding to one pixel region may not be connected to an adjacent pixel electrode 335 corresponding to the adjacent pixel region. In addition, the reflective electrode 338 may be wider than the data line 322 and the TFT "T," and may cover the data line 322 and the TFT "T." Accordingly, the reflective electrode 338 may function as a black matrix to prevent light leakage at the edge portion of the pixel electrode 334 and generation of a photocurrent in the TFT "T."

In FIG. 7, a color filter layer 348 including red, green, and blue sub-color filters 343, 344, and 345 may be formed on an inner surface of the second substrate 340. Accordingly, one of the sub-color filters 343, 344, and 345 may correspond to the reflective electrode 338 and the pixel electrode 334 of one pixel region. For example, the sub-color filters 343, 344, and 345 may be formed such that a border between the adjacent sub-color filters 343, 344, and 345 may correspond to a left end of the data line 322.

Next, a common electrode 346 of transparent conductive material may be formed on the color filter layer 344. The common electrode 346 may be formed of the same material as the pixel electrode 334, i.e., indium-tin-oxide (ITO) or indium-zinc-oxide (IZO). Then, an overcoat layer (not shown) may be formed between the color filter layer 344 and the common electrode 346.

In FIG. 7, a liquid crystal layer 350 may be formed between the pixel electrode 334 and the common electrode 346, and between the reflective electrode 338 and the common electrode 346. To improve light efficiency, a thickness of the liquid crystal layer 350 may be adjusted by the organic insulating film 336. For example, a thickness of the liquid crystal layer 350 corresponding to a transmissive portion may be substantially twice the thickness corresponding to a micro-reflective portion where the reflective electrode 338 may be formed.

According to the present invention, a reflective electrode may be formed over a gate line, a data line, and a TFT. Since the reflective electrode may reflect ambient light, the LCD device according to the present invention may substantially use an entire area as a display region, thereby improving aperture ratio.

Figure 8:
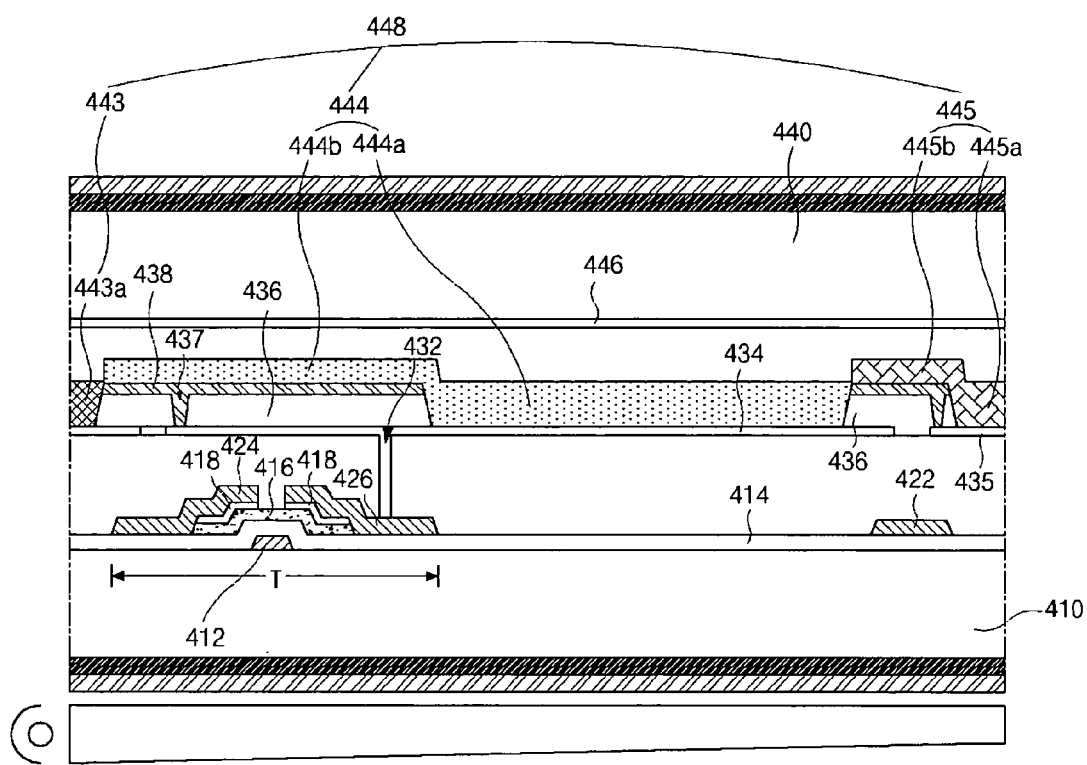
FIG. 8 is a schematic cross sectional view of another exemplary liquid crystal display device according to the present invention.

FIG. 8 is a schematic cross sectional view of another exemplary liquid crystal display device according to the present invention. In FIG. 8, a liquid crystal display (LCD) device may have a color filter-on-thin film transistor (COT) structure. Since optical films, polarizing plates, and a backlight unit of the LCD device according to the present invention may be similar to those of the LCD device of FIG. 5, illustration of the optical films, the polarizing plates, and the backlight unit will be omitted.

In FIG. 8, first and second substrates 410 and 440 may be disposed to face and be spaced apart from each other, wherein the first and second substrates 410 and 440 may be formed of transparent material. In addition, a gate electrode 412 may be formed on an inner surface of the first substrate 410, and a gate insulating layer 414 may be formed on the gate electrode 412. Although not shown, a gate line connected to the gate electrode 412 may be formed under the gate insulating layer 414.

Next, an active layer 416 may be formed on the gate insulating layer 414, and an ohmic contact layer 418 may be formed on the active layer 416, and source and drain electrodes 424 and 426 spaced apart from each other may be formed on the ohmic contact layer 418. In addition, a data line 422 connected to the source electrode 424 may be formed on the gate insulating layer 414, wherein the data line 422 may cross the gate line (not shown) to define a pixel region (not shown). Thus, the source and drain electrodes 424 and 426 may constitute a thin film transistor (TFT) "T" along with the gate electrode 412.

Then, a passivation layer 430 may be formed on the data line 422 and the source and drain electrodes 424 and 426, wherein the passivation layer 430 may be formed of organic material having a relatively low dielectric constant. In addition, the passivation layer 430 may have a first contact hole 432 to expose a portion of the drain electrode 426.

In FIG. 8, a pixel electrode 434 of transparent conductive material may be formed on the passivation layer 430, and may be connected to the drain electrode 426 through the first contact hole 432. In addition, the pixel electrode 434 may be formed of indium-tin-oxide (ITO) or indium-zinc-oxide (IZO), and may cover the TFT "T" and may overlap the data line 422.

Next, an organic insulating film 436 may be formed on the pixel electrode 434 over the data line 422 and the TFT "T." In addition, the organic insulating film 436 may overlap an edge portion of the pixel electrode 434, and may have a second contact hole 437 to expose a portion of the pixel electrode 434. The organic insulating film 436 may be formed of the same material as the passivation layer 430, i.e., an organic material having a relatively low dielectric constant, and may be formed to be wider the data line 422 and the TFT "T."

Then, a reflective electrode 438 may be formed on the organic insulating film 436, and may be connected to the pixel electrode 434 through the second contact hole 437. The reflective electrode 438 corresponding to one pixel region may not be connected to an adjacent pixel electrode 435 corresponding to the adjacent pixel region. In addition, the reflective electrode 438 may be wider than the data line 422 and the TFT "T," and may cover the data line 422 and the TFT "T." Accordingly, the reflective electrode 438 may function as a black matrix to prevent light leakage at the edge portion of the pixel electrode 434 and generation of a photocurrent in the TFT "T."

Next, a color filter layer 448 including red, green, and blue sub-color filters 443, 444, and 445 may be formed on the pixel electrode 434 and the reflective electrode 438. Accordingly, one of the sub-color filters 443, 444, or 445 may correspond to the pixel electrode 434 and the reflective electrode 438 connected to the pixel electrode 434 in one pixel region. Each of the sub-color filters 443, 444, and 445 may have first portions 443a, 444a, and 445a corresponding to the pixel electrode 443, and may have second portions 444b and 445b corresponding to the reflective electrode 438. To obtain uniform color properties, the first portions 443a, 444a, and 445a of each of the sub-color filters 443, 444, and 445 may be formed to have a thickness greater than a thickness of the second portions 444b and 445b. While ambient light may pass through the second portions 444b and 445b twice, light from a backlight unit may pass through the first portions 443a, 444a, and 445a only once. If the first portions 443a, 444a, and 445a have the same thickness as the second portions 444b and 445b, the first portions 443a, 444a, and 445a may have different color properties from the second portions 444b and 445b. Accordingly, uniform color properties may be obtained by forming each of the sub-colors filter 443, 444, and 445 to have the first and second portions of different thickness.

The color filter layer 448 may be formed by coating and patterning color filter resin on the pixel electrode 434 and the reflective electrode 438. Since the reflective electrode 438 may be formed on the organic insulating film 436 between adjacent pixel electrodes 434 and may overlap the gate line (not shown) and the data line 422, a step difference may be generated along a border between the pixel electrode 434 and the reflective electrode 438. While the color filter resin may be coated on the pixel electrode 434 and the reflective electrode 438, the color filter resin may flow from the reflective electrode 438 to the pixel electrode 434 due to the step difference. Accordingly, the first portions 443a, 444a, and 445a of each of the sub-color filters 443, 444, and 445 on the pixel electrode 434 may be thicker than the second portions 444b and 445b of each of the sub-color filters 443, 444, and 445 on the reflective electrode 438. The thickness difference of each of the sub-color filters 443, 444, and 445 may be adjusted by a viscosity of the color filter resin and a height of the step difference. For example, the thickness of the second portions 444b and 445b may be about one-half of a thickness of the first portions 443a, 444a, and 445a.

Next, a common electrode 446 of transparent conductive material may be formed on an inner surface of the second substrate 440, and may be formed of the same material as the pixel electrode 434, i.e., indium-tin-oxide (ITO) or indium-zinc-oxide (IZO).

According to the present invention, aperture ratio and brightness may be improved by forming a micro-reflective portion over the gate line, the data line, and the TFT. Moreover, since a color filter layer and a TFT may be formed on a substrate, an attachment margin necessary for an LCD device where a TFT and a color filter layer are formed on respective substrates may be reduced and reduction of color property and brightness may be prevented. In addition, since a thickness of a color filter layer in a transmissive portion may be different from a thickness of a color filter in a micro-reflective portion, color properties may be further improved.

According to the present invention, aperture ratio may be improved by forming a reflective electrode over a gate line, a data line, and/or a thin film transistor. Moreover, the aperture ratio may be further improved by forming a color filter layer and a thin film transistor on a same substrate.

It will be apparent to those skilled in the art that various modifications and variations can be made in the liquid crystal display device and method of fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    first and second substrates facing and spaced apart from each other;
    a gate line and a data line on an inner surface of the first substrate;
    a thin film transistor connected to the gate line and the data line;
    a passivation layer on the thin film transistor;

a pixel electrode on the passivation layer;
an organic insulating film on the pixel electrode corresponding to the data line;
a reflective electrode on the organic insulating film and connected to the pixel electrode;
a black matrix on an inner surface of the second substrate corresponding to the thin film transistor;
a common electrode over the black matrix; and
a liquid crystal layer between the reflective electrode and the common electrode.

2. The device according to claim 1, wherein a width of the reflective electrode is greater than a thickness of the data line, and the reflective electrode covers the data line.

3. The device according to claim 1, wherein the organic insulating film and the reflective electrode cover the gate line.

4. The device according to claim 1, wherein a first thickness of the liquid crystal layer corresponding to the pixel electrode is greater than a second thickness of the liquid crystal layer corresponding to the reflective electrode.

5. The device according to claim 4, wherein the first thickness is substantially twice as much as the second thickness.

6. The device according to claim 1, wherein the organic insulating layer is formed of the same material as the passivation layer.

7. The device according to claim 1, wherein the pixel electrode is formed of one of indium-tin-oxide (ITO) and indium-zinc-oxide (IZO).

8. The device according to claim 1, further comprising a backlight unit under the first substrate.

9. The device according to claim 8, further comprising a first polarizing plate on an outer surface of the first substrate and a second polarizing plate on an outer surface of the second substrate.

10. The device according to claim 9, further comprising a first optical film between the first substrate and the first polarizing plate and a second optical film between the second substrate and the second polarizing plate.

11. The device according to claim 1, further comprising a color filter layer between the black matrix and the common electrode.

12. The device according to claim 11, further comprising an overcoat layer between the color filter layer and the common electrode.

13. The device according to claim 1, further comprising a color filter layer on the pixel electrode and the reflective electrode.

14. The device according to claim 13, wherein a first thickness of the color filter layer corresponding to the pixel electrode is greater than a second thickness of the color filter layer corresponding to the reflective electrode.

15. The device according to claim 1, wherein the pixel electrode overlaps the data line.

16. A liquid crystal display device, comprising:
first and second substrates facing and spaced apart from each other;
a gate line and a data line on an inner surface of the first substrate;
a thin film transistor connected to the gate line and the data line;
a passivation layer on the thin film transistor;
a pixel electrode on the passivation layer;
an organic insulating film on the pixel electrode corresponding to the data line and the thin film transistor;
a reflective electrode on the organic insulating film and connected to the pixel electrode;
a common electrode over an inner surface of the second substrate; and
a liquid crystal layer between the reflective electrode and the common electrode.

17. The device according to claim 16, wherein a width of the reflective electrode is greater than a thickness of the data line and the reflective electrode covers the data line.

18. The device according to claim 16, wherein the organic insulating film and the reflective electrode cover the gate line.

19. The device according to claim 16, wherein a first thickness of the liquid crystal layer corresponding to the pixel electrode is greater than a second thickness of the liquid crystal layer corresponding to the reflective electrode.

20. The device according to claim 19, wherein the first thickness is substantially twice as much as the second thickness.

21. The device according to claim 16, wherein the organic insulating layer is formed of the same material as the passivation layer.

22. The device according to claim 16, wherein the pixel electrode is formed of one of indium-tin-oxide (ITO) and indium-zinc-oxide (IZO).

23. The device according to claim 16, further comprising a backlight unit under the first substrate.

24. The device according to claim 23, further comprising a first polarizing plate on an outer surface of the first substrate and a second polarizing plate on an outer surface of the second substrate.

25. The device according to claim 24, further comprising a first optical film between the first substrate and the first polarizing plate and a second optical film between the second substrate and the second polarizing plate.

26. The device according to claim 16, further comprising a color filter layer between the second substrate and the common electrode.

27. The device according to claim 26, further comprising an overcoat layer between the color filter layer and the common electrode.

28. The device according to claim 16, further comprising a color filter layer on the pixel electrode and the reflective electrode.

29. The device according to claim 28, wherein a first thickness of the color filter layer corresponding to the pixel electrode is greater than a second thickness of the color filter layer corresponding to the reflective electrode.

30. The device according to claim 16, wherein the pixel electrode overlaps the data line.

31. A method of fabricating a liquid crystal display device, comprising:
forming a gate line and a data line on an inner surface of a first substrate;
forming a thin film transistor on the first substrate connected to the gate line and the data line;
forming a passivation layer on the thin film transistor;
forming a pixel electrode on the passivation layer;
forming an organic insulating film on the pixel electrode corresponding to the data line;
forming a reflective electrode on the organic insulating film and connected to the pixel electrode;
forming a black matrix on an inner surface of a second substrate corresponding to the thin film transistor;
forming a common electrode over the black matrix;
providing the second substrate opposite to the first substrate; and
forming a liquid crystal layer between the reflective electrode and the common electrode.

32. The method according to claim 31, wherein a width of the reflective electrode is greater than a thickness of the data line, and the reflective electrode covers the data line.

33. The method according to claim 31, wherein the organic insulating film and the reflective electrode cover the gate line.

34. The method according to claim 31, wherein the organic insulating layer is formed of the same material as the passivation layer.

35. The method according to claim 31, further comprising forming a color filter layer on the pixel electrode and the reflective electrode.

36. The method according to claim 35, wherein a first thickness of the color filter layer corresponding to the pixel electrode is greater than a second thickness of the color filter layer corresponding to the reflective electrode.

37. The method according to claim 31, wherein the pixel electrode overlaps the data line.

38. A method of fabricating a liquid crystal display device, comprising:

forming a gate line and a data line on an inner surface of a first substrate;

forming a thin film transistor on the first substrate connected to the gate line and the data line;

forming a passivation layer on the thin film transistor;

forming a pixel electrode on the passivation layer;

forming an organic insulating film on the pixel electrode corresponding to the data line and the thin film transistor;

forming a reflective electrode on the organic insulating film and connected to the pixel electrode;

forming a common electrode over an inner surface of a second substrate;

providing the second substrate opposite to the first substrate; and forming a liquid crystal layer between the reflective electrode and the common electrode.

39. The method according to claim 38, wherein a width of the reflective electrode is greater than a thickness of the data line and the reflective electrode covers the data line.

40. The method according to claim 38, wherein the organic insulating film and the reflective electrode cover the gate line.

41. The method according to claim 38, wherein the organic insulating layer is formed of the same material as the passivation layer.

42. The method according to claim 38, further comprising forming a color filter layer on the pixel electrode and the reflective electrode.

43. The method according to claim 42, wherein a first thickness of the color filter layer corresponding to the pixel electrode is greater than a second thickness of the color filter layer corresponding to the reflective electrode.

44. The method according to claim 38, wherein the pixel electrode overlaps the data line.

* * * * *